United States Patent
Li et al.

(10) Patent No.: US 11,269,675 B2
(45) Date of Patent: Mar. 8, 2022

(54) COMPREHENSIVE SCHEDULING METHOD AND DEVICE FOR PROBLEM OF INTERRUPTABILITY HOLDER PREEMPTION

(71) Applicant: SHANGHAI JIAO TONG UNIVERSITY, Shanghai (CN)

(72) Inventors: Jian Li, Shanghai (CN); Haibing Guan, Shanghai (CN); Xiaokang Hu, Shanghai (CN); Wang Zhang, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 316 days.

(21) Appl. No.: 16/467,933

(22) PCT Filed: Jun. 25, 2018

(86) PCT No.: PCT/CN2018/092618
§ 371 (c)(1),
(2) Date: Jun. 7, 2019

(87) PCT Pub. No.: WO2019/128158
PCT Pub. Date: Jul. 4, 2019

(65) Prior Publication Data
US 2021/0149698 A1  May 20, 2021

(51) Int. Cl.
*G06F 9/455* (2018.01)
*G06F 9/48* (2006.01)
*G06F 9/50* (2006.01)

(52) U.S. Cl.
CPC ........ *G06F 9/45558* (2013.01); *G06F 9/4812* (2013.01); *G06F 9/4881* (2013.01);
(Continued)

(58) Field of Classification Search
CPC .. G06F 9/45558; G06F 9/4812; G06F 9/4881; G06F 9/505; G06F 9/5077; G06F 2009/45591; G06F 2009/45595
See application file for complete search history.

(56) References Cited

U.S. PATENT DOCUMENTS

2010/0138208 A1   6/2010  Hattori et al.
2011/0197003 A1*  8/2011  Serebrin ................. G06F 13/24
                                                           710/267
(Continued)

FOREIGN PATENT DOCUMENTS

CN        1449522 A      10/2003
CN      101968746 A       2/2011
(Continued)

OTHER PUBLICATIONS

Guan et al., "SR-IOV Based Network Interrupt-Free Virtualization with Event Based Polling," IEEE Journal on Selected Areas in Communications, vol. 31, No. 12, pp. 1-14, Dec. 2013.
(Continued)

*Primary Examiner* — Wissam Rashid
(74) *Attorney, Agent, or Firm* — Blank Rome LLP

(57) ABSTRACT

The present invention finds and defines a problem which possibly exists in an interrupt remapping mechanism under a virtual symmetric multiprocessing environment, i.e., a problem of Interruptability Holder Preemption (IHP). This problem causes the interrupt remapping mechanism to fail and reduces I/O performance of virtual machines. In order to solve the IHP problem, the present invention provides a proactive VCPU comprehensive scheduling method based on interruptability holder information. This method is based on Kernel-Based Virtual Machines (KVMs) which are widely used at present and paravirtualization network models thereof. By globally controlling and analyzing a running state of an interruptability holder and simultaneously con-
(Continued)

sidering global scheduling fairness of a system, a VCPU comprehensive scheduling method is established, which can effectively eliminate the IHP problem and obviously improve the I/O performance of the virtual machines.

4 Claims, 2 Drawing Sheets

(52) U.S. Cl.
CPC ............ *G06F 9/505* (2013.01); *G06F 9/5077* (2013.01); *G06F 2009/45591* (2013.01); *G06F 2009/45595* (2013.01)

(56) References Cited

U.S. PATENT DOCUMENTS

2016/0259664 A1* 9/2016 Guan .................. G06F 9/45504
2018/0348840 A1* 12/2018 Tsirkin ................. G06F 1/3293

FOREIGN PATENT DOCUMENTS

| | | |
|---|---|---|
| CN | 103744716 A | 4/2014 |
| CN | 105210041 A | 12/2015 |
| CN | 106095578 A | 11/2016 |
| CN | 108123850 A | 6/2018 |
| EP | 2575040 A1 | 4/2013 |

OTHER PUBLICATIONS

Li et al., "vINT: Hardware-Assisted Virtual Interrupt Remapping for SMP VM with Scheduling Awareness," IEEE 7th International Conference on Cloud Computing Technology and Science, pp. 234-241, 2015.

Huang et al., "Research and Optimizations for High Performance I/O Virtualization Based on SR-IOV," Department of Computer Science, School of Electronic Information and Electrical Engineering, Shanghai Jiao Tong University, Jan. 10, 2013.

International Search Report for PCT/CN2018/092618 dated Sep. 3, 2018 with English Translation.

* cited by examiner

COMPREHENSIVE SCHEDULING METHOD AND DEVICE FOR PROBLEM OF INTERRUPTABILITY HOLDER PREEMPTION

CROSS REFERENCE TO RELATED APPLICATIONS

This is a U.S. National Stage Application, filed under 35 U.S.C. 371, of International Patent Application No. PCT/CN2018/092618, filed on Jun. 25, 2018, which claims priority to Chinese Patent Application No. 201711419235.4 filed on Dec. 25, 2017, the disclosures of which are incorporated herein by reference in their entirety.

FIELD OF THE INVENTION

The present invention relates to the field of computer technology, and in particular to a comprehensive scheduling method and device for problem of interruptability holder preemption.

DESCRIPTION OF THE PRIOR ART

System virtualization creates an environment for simultaneous running of a plurality of virtual machines on the same physical server. A Virtual Machine Monitor (VMM) abstracts underlying hardware as virtual resources and manages running of virtual machines. I/O virtualization is an important branch of system virtualization and is responsible for providing I/O devices for virtual machines. With the continuous increase of network interconnection speed, I/O virtualization has already been one of key subjects on cloud data centers.

Virtual Symmetric Multiprocessing (VSMP) technology enables one virtual machine to be capable of having a plurality of virtual CPUs (VCPUs), which not only realizes higher concurrency level and resource utilization rate, but also facilitates further improvement of I/O throughput and responsivity. Hardware-based interrupt submission technologies such as Message Signaling Interrupt and Posted Interrupt may efficiently submit I/O device interrupt to a destination virtual machine for processing. However, under a VSMP environment, since a plurality of VCPUs need to share one physical CPU kernel in a time division manner, the processing process of virtual interrupt becomes complex: the VCPU which is responsible for processing virtual interrupt possibly is scheduled out by a VMM scheduler, consequently the processing of interrupt events is delayed and thus the I/O performance of virtual machines is influenced.

Many studies have been carried out, devoting to improving I/O throughput and responsivity under a VSMP environment. Existing solutions approximately can be divided into three types: side-core policy, scheduling-correlated policy and interrupt remapping mechanism. Side-core policy uses one separate CPU kernel specifically for I/O processing of virtual machines, which, although I/O performance can be guaranteed, very easily causes waste of CPU resources. Scheduling-correlated policy decreases latency time of each VCPU in a running queue by decreasing time slice of a VMM scheduler, so as to reduce I/O delay. However, this method could cause frequency context switching and does not facilitate running of CPU-intensive tasks. Comparatively, interrupt remapping mechanism intelligently remaps I/O device interrupt to the most suitable one of a plurality of VCPUs of the virtual machine, such that not only can I/O performance be improved, but also other side effects are not introduced.

Up to now, interrupt remapping mechanism has already been one of the most attractive I/O performance solutions under a VSMP environment. However, in an actual process, interrupt remapping mechanism possibly has a risk of failure. How to prevent interrupt remapping mechanism from failing is a problem which needs to be solved urgently.

SUMMARY OF THE INVENTION

As described in the description of the prior art, interrupt remapping mechanism has a risk of failure. For the above situation, the inventor carries out researches and finds that, if a Linux operating system is operated in a virtual machine, an NAPI processing mode for a network I/O device in this system may conflict with the interrupt remapping mechanism, such that the interrupt remapping mechanism fails. NAPI is a technology which is adopted in Linux for improving network processing efficiency, its core concept is not to read data by adopting an interrupt mode, but to read date by firstly adopting service programs for interrupt of a process for awaking data receiving, then disabling the device interrupt to enter a polling mode, and finally enable the device interrupt after the polling mode ends. Since NAPI needs to manipulate the interruptability of the I/O device and interrupt remapping needs to modify the destination address of the device interrupt, if no coordination is performed, a conflict will be caused such that interrupt remapping fails.

So far, the inventor firstly has found and defined a problem which possibly exists in an interrupt remapping mechanism under a virtual symmetric multiprocessing environment, i.e., a problem of Interruptability Holder Preemption (IHP).

IHP problem has the following definition. It is supposed that when a certain VCPU of a virtual machine is processing an interrupt of a certain network I/O device at current and enters a polling mode of an NAPI processing process, the interruptability of this device is disabled, and at this moment the VCPU is called as an Interruptability Holder (IH). If the IH is scheduled out by a VMM scheduler at this moment, an IHP problem occurs. During a period from this moment to the time when IH is scheduled again and the device interruptability is enabled again, the network I/O device cannot produce interruptability, even though it receives an external data packet. Since no interruptability is produced, interrupt remapping fails. The data packet received by the device cannot be immediately processed and consequently I/O performance is reduced.

Therefore, on the basis of the above-mentioned researches, the inventor provides a comprehensive scheduling method and device for a problem of interruptability holder preemption under a virtual symmetric multiprocessing environment, so as to solve the IHP problem. This method is based on Kernel-Based Virtual Machines (KVMs) which are widely used at present and paravirtualization network models thereof. By globally controlling and analyzing a running state of an interruptability holder and simultaneously considering global scheduling fairness of a system, a comprehensive scheduling method for VCPU is established, which can effectively eliminate the IHP problem and obviously improve the I/O performance of the virtual machines.

The technical solution of the present invention provides a comprehensive scheduling method for a problem of interruptability holder preemption, comprising the following steps: step 1: when a virtual network device receives a data packet, selecting one virtual CPU from a plurality of virtual CPUs as a destination virtual CPU, and then injecting arrival of a virtual interrupt notification data packet; step 2: analyzing information of the virtual interrupt and marking the destination virtual CPU as an interruptability holder; step 3: the destination virtual CPU receiving the virtual interrupt, triggering a corresponding interrupt processing function, disabling interruptability of the virtual network device and entering a polling mode to read the data packet; step 4: when a virtual CPU needs to be scheduled out of a physical CPU, determining whether the virtual CPU is marked as the interruptability holder, and if so, continuously scheduling the virtual CPU to run on the physical CPU and recording the virtual CPU as a favored virtual CPU; and step 5: determining in a polling manner whether the favored virtual CPU has already enabled the interruptability of the virtual network device, and if so, immediately scheduling the favored virtual CPU out of the physical CPU.

Alternatively, in step 1, one virtual CPU is selected as the destination virtual CPU according to an interrupt remapping mechanism.

Alternatively, in step 4, when the virtual CPU which needs to be scheduled out of the physical CPU is not marked as the interruptability holder, the virtual CPU is immediately scheduled out of the physical CPU.

Alternatively, in step 5, whether the favored virtual CPU has already enabled the interruptability of the virtual network device is determined in a VM Exit processing function.

The technical solution of the present invention further provides a comprehensive scheduling device for a problem of interruptability holder preemption, comprising: a plurality of virtual CPUs; a selection module used for, when a virtual network device receives a data packet, selecting one virtual CPU from the plurality of virtual CPUs as a destination virtual CPU, and then injecting arrival of a virtual interrupt notification data packet, the destination virtual CPU being used for receiving the virtual interrupt, triggering a corresponding interrupt processing function, disabling interruptability of the virtual network device and entering a polling mode to read the data packet; an interruptability holder detection module used for analyzing information of the virtual interrupt and marking the destination virtual CPU as an interruptability holder; a scheduling module connected with the interruptability holder detection module and used for, when a virtual CPU needs to be scheduled out of a physical CPU, determining whether the virtual CPU is marked as the interruptability holder according to the information of the interruptability holder marked by the interruptability holder detection module, and if so, continuously scheduling the virtual CPU to run on the physical CPU, recording the virtual CPU as a favored virtual CPU, and immediately scheduling the favored virtual CPU out of the physical CPU when the favored virtual CPU enables the interruptability of the virtual network device; and a determination module connected with the scheduling module and used for determining in a polling manner whether the favored virtual CPU has already enabled the interruptability of the virtual network device, and sending determination information to the scheduling module.

Alternatively, the selection module is used for selecting one virtual CPU as the destination virtual CPU according to an interrupt remapping mechanism.

Alternatively, the scheduling module comprises: a delay scheduling unit connected with the interruptability holder detection module and used for continuously scheduling the virtual CPU marked as the interruptability holder to run on the physical CPU and recording the virtual CPU as the favored virtual CPU; an immediate scheduling unit connected with the determination module and used for immediately scheduling the virtual CPU which is not marked as the interruptability holder and the favored virtual CPU which has already disabled the interruptability of the virtual network device out of the physical CPU; and a conventional scheduling unit connected with the delay scheduling unit and used for immediately scheduling the virtual CPU, which needs to be scheduled out and is not marked as the interruptability holder, out of the physical CPU.

Alternatively, the determination module is used for determining whether the favored virtual CPU has already enabled the interruptability of the virtual network device in a VM Exit processing function.

The proactive VCPU comprehensive scheduling method based on interruptability holder information provided by the present invention has the following beneficial technical effects:

(1) The present invention adopts the interrupt remapping mechanism to submit the virtual interrupt to the virtual CPU which is running at current, and thus obviously reduces the problem of decrease of virtual machine network responsivity caused by scheduling delay of the virtual CPU.

(2) The solution of the present invention only needs to record the information of the destination VCPU of the virtual interrupt and does not involve the modification of the virtual machine operating system, and it is fully transparent to the virtual machine.

(3) The problem of interruptability holder preemption is the root cause of failure of the interrupt remapping mechanism and is also an important cause of bottleneck of the I/O virtualization performance. The present invention fully eliminates the problem of interruptability holder preemption in the interrupt remapping mechanism, such that the network I/O performance of the virtual machine is greatly improved.

DETAILED DESCRIPTION OF THE PREFERRED EMBODIMENTS

The embodiments of a comprehensive scheduling method and a comprehensive scheduling device for a problem of interruptability holder preemption provided by the present invention will be described below in detail with reference to the drawings. The embodiments are implemented on the premise of the technical solution of the present invention, and detailed implementation modes and specific operation processes are given, but applicable platforms are not limited to the embodiments below.

This embodiment is based on Kernel-Based Virtual Machines (KVMs) which are widely used at present and paravirtualization network I/O models thereof (consisting of a front-end drive in a virtual machine and a rear-end drive in a VMM).

Figure 1:
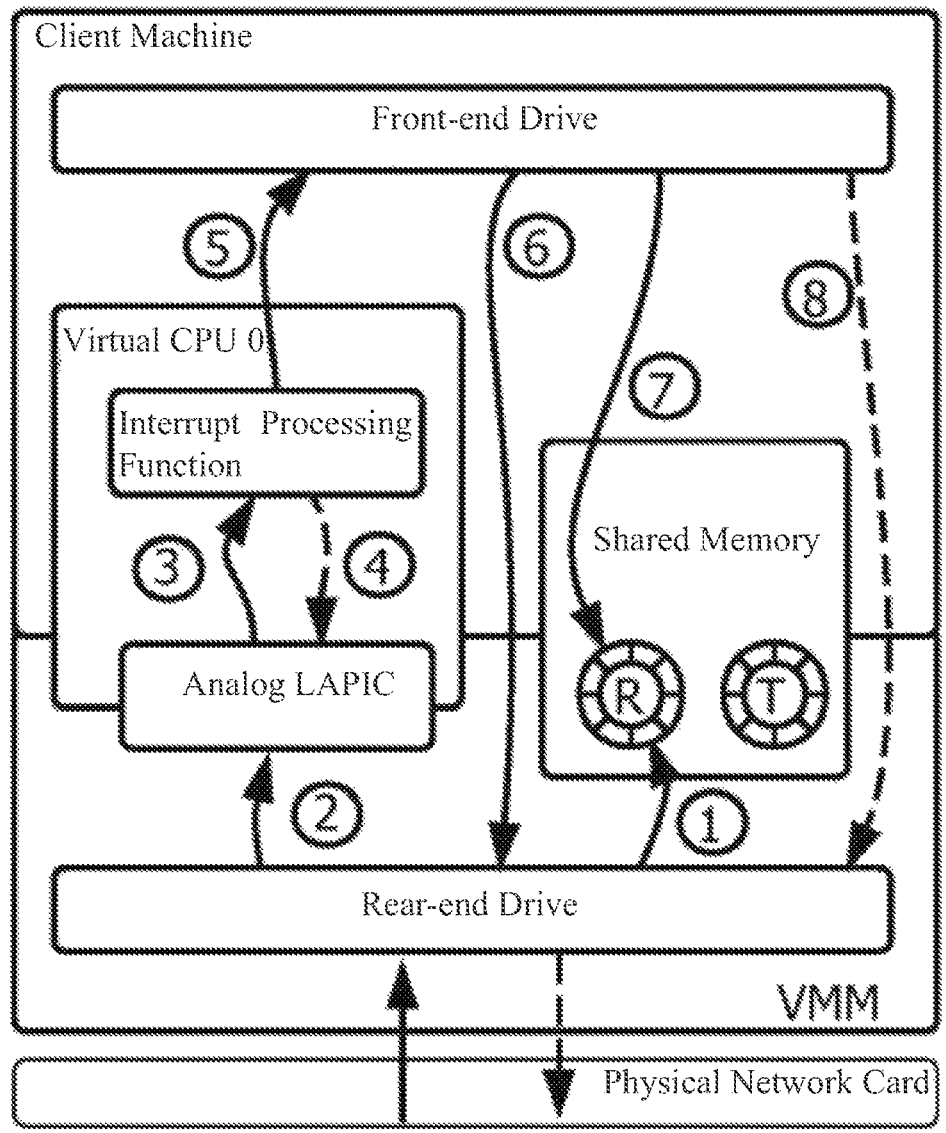
FIG. 1 is a schematic diagram of an interrupt processing flow under a traditional paravirtualization environment.

Please refer to FIG. 1, which is a schematic diagram of an interrupt processing flow under a traditional paravirtualization environment.

Under a paravirtualization environment, a network device of a virtual machine consists of two parts, i.e., the front-end drive running in the virtual machine and the rear-end drive running in the VMM, wherein the front-end drive and the rear-end drive share data and control information through a shared memory. After the rear-end device receives a network data packet from a physical network card or a virtual switch and copies it into the shared memory (path ①), the VMM will inject a virtual interrupt into the virtual machine to trigger the receiving of the data packet. An analog Local Advanced Programmable Interrupt Controller (LAPIC) of a destination virtual CPU0 of the virtual interrupt receives the virtual interrupt (path ②) and triggers an interrupt processing function in a client Interrupt Descriptor Table (IDT) (path ③). The interrupt processing function firstly initiates one End of Interrupt (EOI) write operation to notify the analog LAPIC of that the virtual interrupt has already been processed (path ④), then the interrupt processing function enters an NAPI processing process (path ⑤), the device (rear-end drive) interruptability is disabled (path ⑥) and a polling mode is entered to read data from the shared memory (path ⑦). It needs to be noted that NAPI mechanism utilizes one softirq thread to access the network data packet in the shared memory in a polling manner. Once the receiving of the data packet is completed, the virtual CPU0 will set the front-end drive to exit from the polling mode and enable the interruptability (path ⑧), and wait for injection of a next virtual interrupt.

Figure 2:
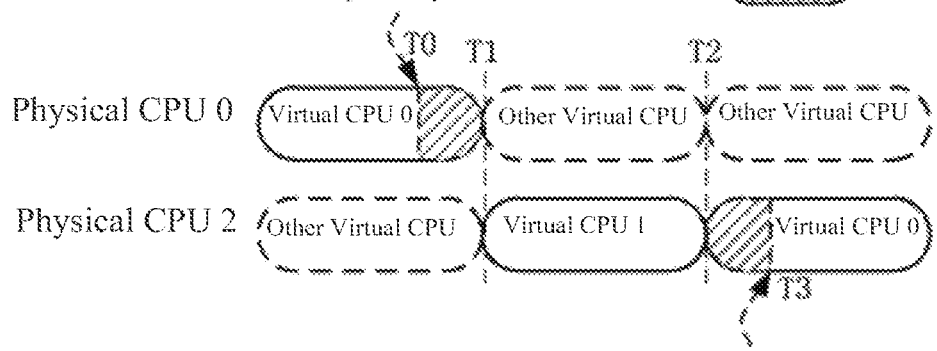
FIG. 2 is an example diagram of a problem of interruptability holder preemption according to the present invention.

Please refer to FIG. 2, which is an example diagram of the IHP problem according to the present invention.

Under virtual symmetric multiprocessing architecture, a virtual machine V totally has two VCPUs (virtual CPU 0 and virtual CPU 1), and the virtual CPU 0 firstly receives a virtual interrupt and disables the interruptability of the front-end device at a moment T0. If the virtual CPU 0 is scheduled out of a physical CPU 0 at a moment T1, since the interruptability of the front-end device was disabled before, a network I/O event processed by the virtual CPU 1 subsequently redirected by means of the interrupt remapping mechanism cannot be submitted to the virtual machine V in time until the VCPU 0 is scheduled back to a physical CPU 1 at a moment T2 and enables the interruptability of the front-end device. Therefore, in a period from T1 to T2, the interrupt remapping mechanism fully fails, the network I/O performance of the virtual machine is still restricted by scheduling delay of the VCPU, and consequently the problem of interruptability holder preemption described above in the present invention is caused.

Figure 3:
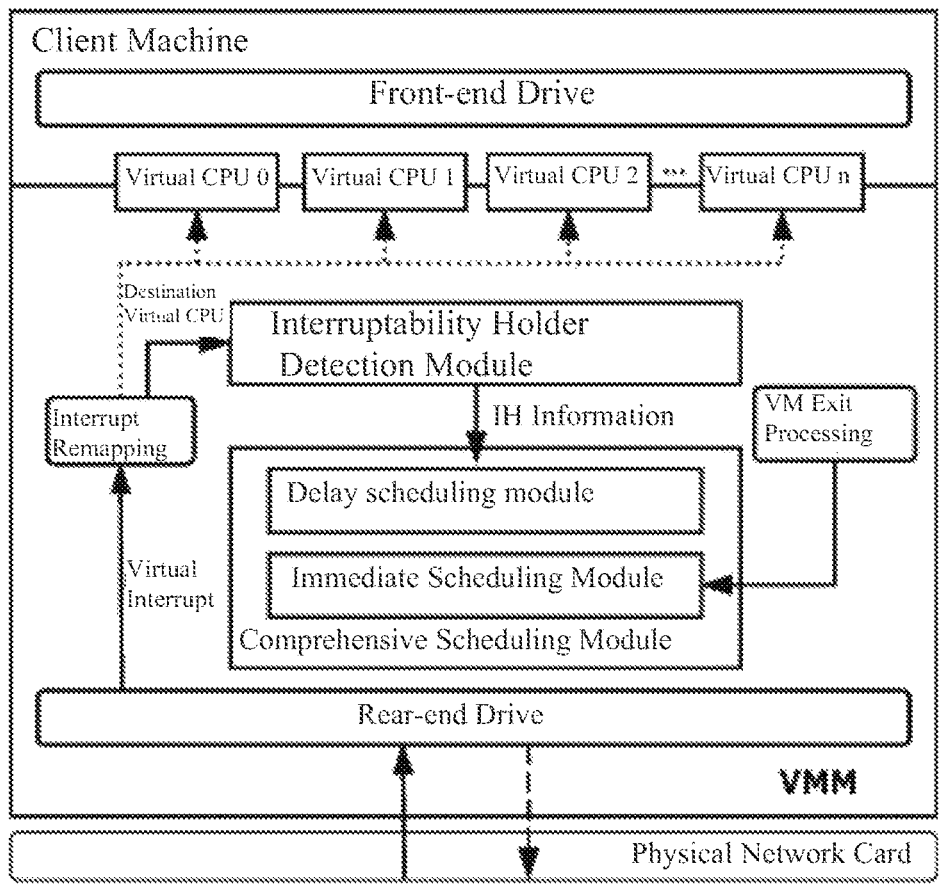
FIG. 3 is a schematic diagram of a flow of a comprehensive scheduling method for a problem of interruptability holder preemption according to one embodiment of the present invention.

Please refer to FIG. 3, which is a schematic diagram of a flow of a comprehensive scheduling method for a problem of interruptability holder preemption according to the present invention. The method comprises the following steps.

In step S1, when a virtual network device receives a data packet, one virtual CPU is selected from a plurality of virtual CPUs as a destination virtual CPU, and then arrival of a virtual interrupt notification data packet is injected. In this embodiment, the virtual machine network device consists of two parts, i.e., a front-end drive and a rear-end drive, and comprises a plurality of virtual CPUs. Specifically, the rear-end drive of virtual machine running in the VMM receives a network data packet from a network bridge or a virtual switch and copies the data packet into the shared memory with the front-end drive, the VMM selects one suitable VCPU as a destination virtual CPU for the corresponding virtual machine by utilizing the interrupt remapping mechanism, and then injects arrival of the virtual interrupt notification data packet. In other specific embodiments, other methods may also be adopted for selecting the suitable VCPU as the destination virtual CPU.

In step S2, information of the virtual interrupt is analyzed and the destination virtual CPU is marked as an interruptability holder. Specifically, an interruptability holder detection module in the VMM analyzes the information of the virtual interrupt, marks the destination virtual CPU as the Interruptability Holder (IH), and form IH information.

In step S3, the destination virtual CPU receives the virtual interrupt, triggers a corresponding interrupt processing function, disables interruptability of the virtual network device and enters a polling mode to read the data packet. Specifically, the destination virtual CPU receives the virtual interrupt, triggers a corresponding interrupt processing function, enters an NAPI processing process, disables the interrupt of the device (rear-end drive) and enters a polling mode to read data from the shared memory.

In step S4, when a virtual CPU needs to be scheduled out of a physical CPU, whether the virtual CPU is marked as the interruptability holder is determined, and if so, the virtual CPU is continuously scheduled to run on the physical CPU and the virtual CPU is recorded as a favored virtual CPU. Specifically, when the interruptability holder (VCPU) recorded in step S2 needs to be scheduled out of the physical CPU, a delay scheduling module in the VMM determines whether the virtual CPU is an interruptability holder based on the IH information provided by an interruptability holder detection module. If so, the delay scheduling module continuously schedules the virtual CPU to run on the physical CPU and records it as a favored VCPU. If not, the virtual CPU is immediately scheduled out of the physical CPU.

In step S5, whether the favored virtual CPU has already enabled the interruptability of the virtual network device is determined in a polling manner, and if so, the favored virtual CPU is immediately scheduled out of the physical CPU. Specifically, an immediate scheduling module in the VMM determines whether the favored VCPU recorded in step 4 has already enabled the interruptability of the rear-end drive in a VM Exit processing function which frequently occurs. For the favored VCPU which has already enabled the interruptability of the device, the immediate scheduling module immediately schedules the favored VCPU out of the physical CPU. The present invention utilizes the VM Exist mechanism in Intel VT-x technology and determines whether the favored VCPU has already enabled the interruptability of the device in a polling-like manner in the VM Exit processing function. Once the interruptability has already been enabled, the immediate scheduling module immediately schedules the favored VCPU out of the physical CPU, running opportunities are provided for other threads in the system, not only can the global scheduling fairness of the system be fully guaranteed, but also the IHP problem can be avoided, and the overall performance is improved.

As compared with the interrupt processing process under the traditional paravirtualization environment, monitoring of the interruptability holder information and more elaborate and comprehensive VCPU scheduling policies are included into the interrupt processing flow in this embodiment.

Figure 4:
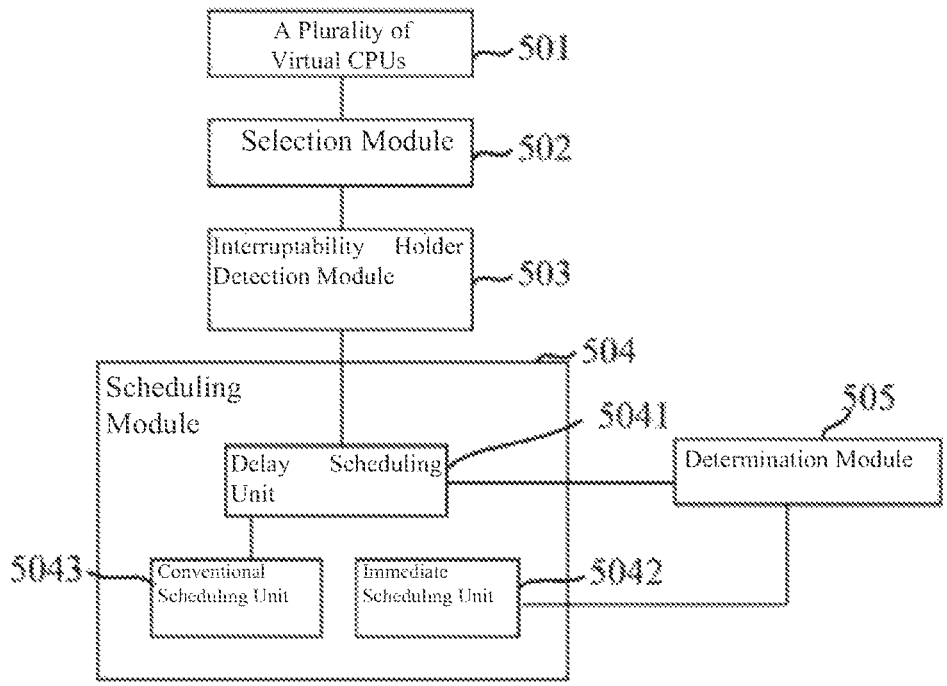
FIG. 4 is a structural schematic diagram of a comprehensive scheduling device for a problem of interruptability holder preemption according to one embodiment of the present invention.

Please refer to FIG. 4, which is a structural schematic diagram of a comprehensive scheduling device for a problem of interruptability holder preemption provided in one embodiment of the present invention.

The comprehensive scheduling device comprises: a plurality of virtual CPUs 501, a selection module 502, an interruptability holder detection module 503, a scheduling module 504 and a determination module 505.

The selection module 502 is used for, when a virtual network device receives a data packet, selecting one virtual CPU from the plurality of virtual CPUs as a destination virtual CPU, and then injecting arrival of a virtual interrupt notification data packet, wherein the destination virtual CPU is used for receiving the virtual interrupt, triggering a corresponding interrupt processing function, disabling interruptability of the virtual network device and entering a polling mode to read the data packet. The selection module 502 may select one virtual CPU as a destination virtual CPU according to the interrupt remapping mechanism.

The interruptability holder detection module 503 is connected with the selection module and is used for analyzing information of the virtual interrupt and marking the destination virtual CPU selected by the selection module 502 as an interruptability holder.

The scheduling module 504 is connected with the interruptability holder detection module 503 and is used for, when a virtual CPU needs to be scheduled out of a physical CPU, determining whether the virtual CPU is marked as the interruptability holder according to the information of the interruptability holder marked by the interruptability holder detection module 503, and if so, continuously scheduling the virtual CPU to run on the physical CPU, recording the virtual CPU as a favored virtual CPU, and immediately scheduling the favored virtual CPU out of the physical CPU when the favored virtual CPU enables the interruptability of the virtual network device.

The determination module 505 is connected with the scheduling module and is used for determining in a polling manner whether the favored virtual CPU recorded by the scheduling module 504 has already enabled the interruptability of the virtual network device, and sending determination information to the scheduling module 504. The determination module 505 utilizes the VM Exist mechanism in Intel VT-x technology and determines whether the favored VCPU has already enabled the interruptability of the device in a polling-like manner in the VM Exit processing function.

In the specific implementation mode, the scheduling module 504 comprises: a delay scheduling unit 5041 connected with the interruptability holder detection module 503 and the determination module 505, and used for continuously scheduling the virtual CPU marked as the interruptability holder to run on the physical CPU, recording the virtual CPU as the favored virtual CPU, and sending the recorded information of the favored virtual CPU to the determination module 505; an immediate scheduling unit 5042 is connected with the determination module 505 and used for immediately scheduling the favored virtual CPU which has already disabled the interruptability of the virtual network device out of the physical CPU; and a conventional scheduling unit 5043 is connected with the delay scheduling unit 5041 and used for immediately scheduling the virtual CPU which needs to be scheduled out and is not marked as the interruptability holder out of the physical CPU.

The preferred specific embodiments of the present invention have already been described above. It should be understood that one skilled in the art may make various modifications and variations according to the concept of the present invention without contributing any inventive labor. Therefore, all technical solutions which can be obtained by one skilled in the art according to the concept of the present invention on the basis of the prior art through logical analysis, reasoning or limited experiments shall be included in the protective scope determined by the claims.

The invention claimed is:

1. A comprehensive scheduling method for a problem of interruptability holder preemption, wherein the method comprises the following steps:
    step 1: a virtual network device receiving a data packet;
    step 2: selecting a virtual CPU from a plurality of virtual CPUs as a destination virtual CPU, and then injecting arrival of a virtual interrupt notification data packet;
    step 3: analyzing information of the virtual interrupt and marking the destination virtual CPU as an interruptability holder;
    step 4: the destination virtual CPU receiving the virtual interrupt, triggering a corresponding interrupt processing function, disabling interruptability of the virtual network device and entering a polling mode to read the data packet;
    step 5: determining whether a virtual CPU which needs to be scheduled out of a physical CPU is marked as the interruptability holder, and if so, continuously scheduling the virtual CPU which needs to be scheduled out of the physical CPU to run on the physical CPU and recording the virtual CPU which needs to be scheduled out of the physical CPU as a favored virtual CPU; and
    step 6: determining in a polling manner whether the favored virtual CPU has already enabled the interruptability of the virtual network device, and if so, immediately scheduling the favored virtual CPU out of the physical CPU.

2. The comprehensive scheduling method for the problem of interruptability holder preemption according to claim 1, wherein, in step 2, one virtual CPU is selected as the destination virtual CPU according to an interrupt remapping mechanism.

3. The comprehensive scheduling method for the problem of interruptability holder preemption according to claim 1, wherein, in step 5, when the virtual CPU which needs to he scheduled out of the physical CPU is not marked as the interruptability holder, the virtual CPU is immediately scheduled out of the physical CPU.

4. The comprehensive scheduling method for the problem of interruptability holder preemption according to claim 1, wherein, in step 6, whether the favored virtual CPU has already enabled the interruptability of the virtual network device is determined in a VM Exit processing function.

* * * * *